Nov. 28, 1933.  J. H. TAYLOR  1,936,805
PIPE FITTING
Filed Sept. 17, 1931

Inventor:
James Hall Taylor.
By Brown, Jackson, Boettcher & Dienner
Attys.

Patented Nov. 28, 1933

1,936,805

UNITED STATES PATENT OFFICE 1,936,805

PIPE FITTING

James Hall Taylor, Oak Park, Ill.

Application September 17, 1931
Serial No. 563,283

1 Claim. (Cl. 285—111)

My invention relates to pipe fittings, such as elbows and T's, which are joined to connecting piping by welding.

My invention provides means for facilitating proper alignment of the piping in a system in which such fittings are included.

The problem with which I am concerned, as well as the means I provide to meet it, can best be understood and appreciated from illustrations, and I shall therefore refer at once to the accompanying drawing, in which Figures 1 and 2 are, respectively, elevation and plan views of a riser and horizontal pipe connected by an elbow;

Figure 1:
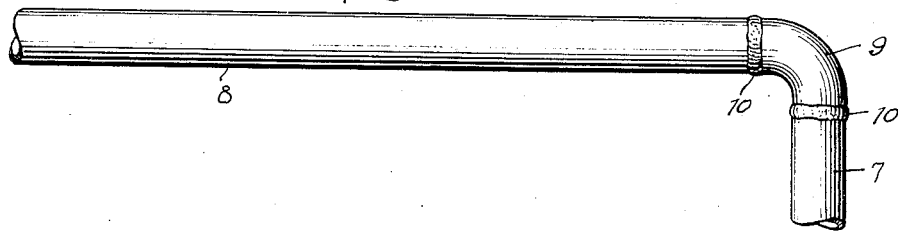
Figure 2:
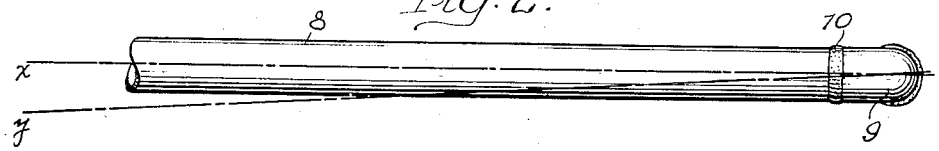

Referring first to Figures 1 and 2, a riser is shown at 7, and a horizontal pipe at 8, these pipes being connected by an elbow 9 welded thereto as indicated at 10, 10. The proper position of the horizontal pipe 8, relative to the riser 7, in the installation, is shown in Figure 2, i. e., with its axis in the position indicated by the dot and dash line $x$. An elbow or a T has what may be termed vertical and horizontal axes, that is, the respective normal axes through the centers of the two outlets of an elbow, or the respective axes of the trunk and branch of a T. In an installation such as has been referred to, for example, it is difficult so to position the elbow, or a T as might be the case, upon the riser 7 in such a way that the horizontal axis of the fitting is coincident with the desired axis $x$. Where such fittings are threaded to their connecting pipes this is no problem since, after the fitting has been screwed upon the riser and the horizontal pipe threaded into the fitting, the horizontal pipe and fitting may still be swung about the axis of the riser to the proper position. However, in the case of welded fittings, which are now having increasing vogue, the fitting is necessarily permanently fixed to one pipe before the connecting pipe is applied. It is difficult, by reason of the nature of the fitting, to recognize slight error in its angular position, and it is not until the connecting pipe has been applied that the error is sufficiently magnified by extension to observe it. Such error is indicated by the dot and dash line $y$ of Figure 2. Then it is too late to correct the error and either the fitting must be removed and rewelded or makeshift correction made by straining, twisting and bending the piping, which is unsightly and unsafe.

According to my invention I provide a fitting wherein the plane in which its axes lie is definitely and accurately defined.

In the specific description to follow I shall, for convenience, refer only to an elbow.

Fittings for welding purposes have beveled edges at their outlets and I provide notches of V-shaped cross section in the crests of these bevels, so positioned that the notches at one outlet will identify the plane of the axis of the other outlet, these notches being preferably provided at each outlet so that the fitting may be used either way, i. e., so that either or any outlet may be first attached in the system of piping. Placed there at the time of and as part of the manufacture of the fitting, and through the use of the same or related jigs, the placing of the notches with the utmost accuracy is assured.

Figure 4:
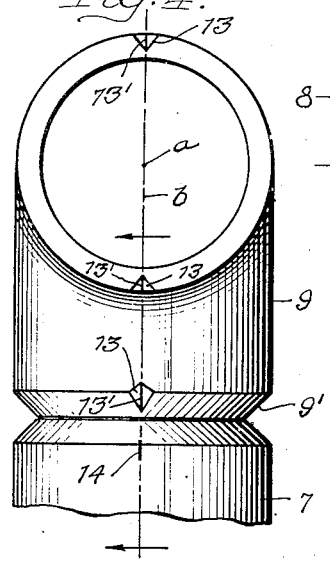
Figure 4 is an end elevational view of either the elbow or T of Figure 3, with a partial showing of the connecting riser.
Figure 3:
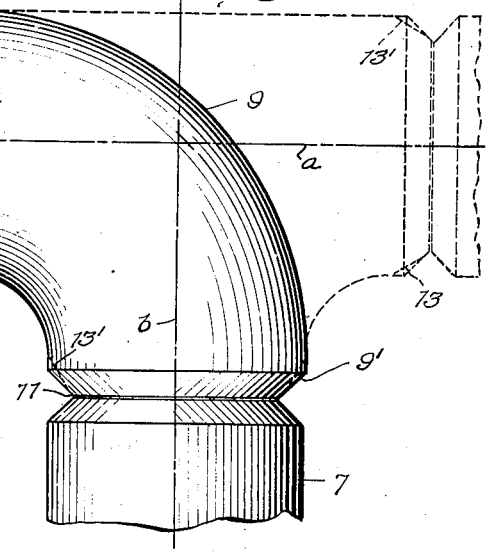
Figure 3 is a side elevational view, on a larger scale, of an elbow, according to my invention, with a partial showing of the connecting piping, this figure, in dotted lines, showing also the manner in which my invention is embodied in a T.
Figure 6:
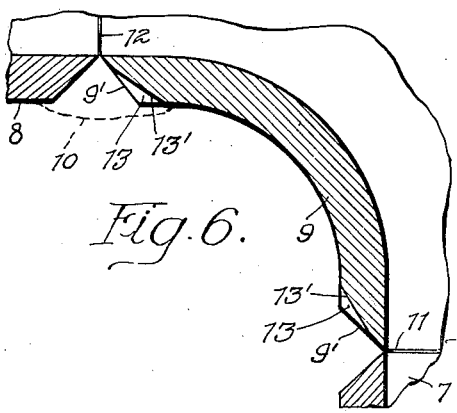
Figure 5 is a plan view of a riser which will serve in the description of the use of my invention and Figure 6 is a sectional view, taken on the plane of the line 6—6 of Figure 4, but on a still larger scale.

Referring to Figure 3, the horizontal axis of the elbow is shown at $a$ and the vertical axis is shown at $b$. Figure 4 also shows the vertical axis $b$, the horizontal axis being there represented by the point $a$. The elbow 9 has its edges at its outlets beveled as shown at 9', 9'. The elbow is accurately machined so that the end face 11 is normal to the axis $b$ and the end face 12 is normal to the axis $a$. The elbow is provided with four notches 13, 13 of V-shaped cross section, in the crest of the bevels as shown. These notches, due to their shape, have an apex line 13' at the bottom, and the notches are so positioned that these lines 13' all lie in the plane of the intersecting axes $a$ and $b$. The notch is readily seen and its shape is conducive to accuracy in use as a guide. It is also significant that the notches are such that they do not reach the ends 11 and 12, thus preserving the ends for proper and uniform relation to the ends of the adjoining piping for welding purposes. This is clearly shown in Figure 6. Also, they extend into the cylindrical surface of the fitting a lesser distance than they extend down the bevels.

Figure 5:
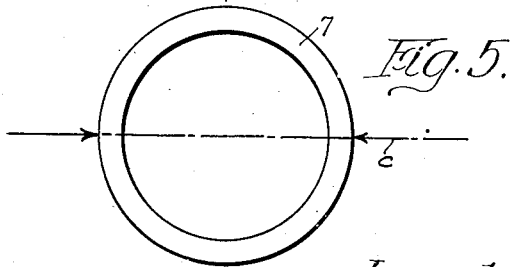

Let it be assumed that the riser 7, with beveled end, is installed. The artisan determines the direction in which he wishes the adjoining pipe to extend, this being done conveniently by a straight-edge or taut cord. He places the straight-edge or cord to intersect the vertical axis of the riser 7, as indicated by the dot and dash line c in Figure 5, and he marks the outer surface of the pipe where indicated by the arrows in this figure. Marking on one side is sufficient, theoretically, but marking on both sides insures accuracy in practice. This marking is shown at 14 in Figure 4, being conveniently at the end of the cylindrical surface of the riser and on the bevel. With this determined, he places the elbow 9 over the riser 7, as shown, with the line 13' of the adjacent notch 13 in accurate alignment with the mark 14. Here again, one notch is theoretically sufficient, but notches on both sides insure accuracy in practice. With the elbow so positioned, it is welded to the pipe 7. Since the lines 13', 13' lie in the plane of the axis a and since the markings 14 have already been placed to define the desired plane of the axis a, the axis a will lie in the proper direction if the line 13' has been accurately aligned with the marking 14. As above stated, the nature of the notch, producing the line 13', is conducive to accuracy and its proximity to the marking 14 is such as to reduce possible error to a minimum. In the welding operation, the welding metal may conveniently be made to cover the notches, as indicated by dotted line 10, Figure 6, so that the notches, having served their purpose, may not remain exposed.

I have described a specific embodiment of my invention which contains the fundamental and the auxiliary advantages which have been referred to. My invention is capable of other embodiments, and capable of uses in its fundamental aspects without more specific features, and I have therefore, drawn the appended claim accordingly.

I claim:—

As an article of manufacture, a pipe fitting having inlet and outlet openings disposed with their axes intersecting, each of said openings being defined by an end of the fitting wall, the plane of the edge of which end lies normal to the respective opening axis, said ends being adapted for welding to the ends of respective pipes, one of said fitting ends being provided with indicating means lying in the common plane of said axes, whereby, when said indicating means registers with a mark on the pipe to be welded to that fitting end, marking the direction which the other pipe is to take, the other fitting end will be in the proper position to receive the other pipe.

JAMES HALL TAYLOR.